(12) United States Patent
Dickerson

(10) Patent No.: US 10,765,181 B2
(45) Date of Patent: Sep. 8, 2020

(54) DUAL BAND APPARATUS FOR HANDLING A PERSONAL COMPUTING DEVICE

(71) Applicant: Kim Dickerson, Hackensack, NJ (US)

(72) Inventor: Kim Dickerson, Hackensack, NJ (US)

( * ) Notice: Subject to any disclaimer, the term of this patent is extended or adjusted under 35 U.S.C. 154(b) by 0 days.

(21) Appl. No.: 16/162,782

(22) Filed: Oct. 17, 2018

(65) Prior Publication Data
US 2019/0116944 A1 Apr. 25, 2019

Related U.S. Application Data

(60) Provisional application No. 62/575,709, filed on Oct. 23, 2017.

(51) Int. Cl.
| | | |
|---|---|---|
| A45F 5/00 | (2006.01) | |
| A44C 5/00 | (2006.01) | |
| A44C 5/14 | (2006.01) | |
| G06F 1/16 | (2006.01) | |

(52) U.S. Cl.
CPC .......... *A44C 5/0053* (2013.01); *A44C 5/0007* (2013.01); *A44C 5/145* (2013.01); *A45F 5/00* (2013.01); *G06F 1/163* (2013.01); *G06F 1/1628* (2013.01); *A45F 2005/008* (2013.01); *A45F 2200/0516* (2013.01)

(58) Field of Classification Search
CPC ..... A44C 5/0053; A44C 5/0007; A44C 5/145; A45F 5/00; A45F 2005/008; A45F 2003/006; A45F 2200/0516; A45F 2200/0508; A45F 2200/0525
See application file for complete search history.

(56) References Cited

U.S. PATENT DOCUMENTS

| | | | | |
|---|---|---|---|---|
| 5,154,506 | A * | 10/1992 | Leard | F21L 15/14 224/222 |
| 9,496,909 | B2 * | 11/2016 | West | H04B 1/385 |
| 2006/0166720 | A1 * | 7/2006 | Dixon | H04B 1/3888 455/575.6 |
| 2009/0270050 | A1 * | 10/2009 | Brown | H04B 1/3833 455/90.3 |
| 2011/0047943 | A1 * | 3/2011 | Burns | B68B 1/06 54/9 |
| 2014/0091116 | A1 * | 4/2014 | Yu | A45F 5/00 224/218 |
| 2015/0136821 | A1 * | 5/2015 | Sorenson | A45F 5/00 224/222 |
| 2017/0332761 | A1 * | 11/2017 | Rundell Murphy | A45F 5/10 |

* cited by examiner

*Primary Examiner* — Corey N Skurdal
(74) *Attorney, Agent, or Firm* — Dinsmore & Shohl LLP

(57) ABSTRACT

A dual stretch band includes a first loop sized for receiving a wearer's hand and a second loop sized for receiving a personal computing device. The first loop and the second loop may be joined at one or more dual stretch band seams.

18 Claims, 4 Drawing Sheets

DUAL BAND APPARATUS FOR HANDLING A PERSONAL COMPUTING DEVICE

TECHNICAL FIELD

The present specification generally relates to apparatuses and methods for handling personal computing devices and, more specifically, to dual stretch band apparatuses including a first band sized to receive a wearer's hand and a second band sized to receive a personal computing device.

BACKGROUND

Personal computing devices are ubiquitous in modern society. Many users of personal computing devices prefer to have their personal computing device on them at all times, including when exercising or during other vigorous activity. Indeed, such a computing device may be critical to a particular exercise or routine as an instructional or tracking tool. It is not surprising then that users of personal computing devices are using them during rigorous activity more and more.

The attention of a user may be focused away from a personal computing device during exercise, such as on a jogging route or a breathing routine and other actions of the user may inhibit the user's coordination or attention to the device. Still, the user may find it necessary to view the device during a routine and thus may handle the device while distracted. Thus, it may be more likely that a user fumbles, mishandles, or drops their personal computing device during exercise. Accordingly, apparatuses and methods for preventing such mishandling are necessary.

SUMMARY

In one embodiment a dual band apparatus includes a first band comprising a first band first end and a first band second end, a second band comprising at least one strip of elastic material having a first end and a second end, and a connection between the first band and the second band. The second band is formed by creating a loop by coupling the first end and the second end at a second band seam such that the second band has an outside surface and the first band is formed by coupling the first band first end and the first band second end to the outside surface of the second band using at least one first band seam.

In another embodiment, a dual band apparatus includes a first band, a second band, and a connection between the first band and the second band. The second band is formed by creating a loop using two similarly sized strips of elastic material each having a first end and a second end and coupling corresponding first ends and second ends at two second band seams to form a second band inside surface and a second band outside surface. The first band is formed by coupling a first band first end and a first band second end to the second band outside surface.

In yet another embodiment, a method of forming a dual band apparatus for supporting a personal computing device in a hand of a wearer includes forming a first band by looping a first strip of material including a first band first end and a first band second end and coupling the first band first end to the first band second end at a first band seam and forming a second band by creating a loop using two similarly sized strips of elastic material each having a first end and a second end and coupling corresponding first ends and second ends at two second band seams.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein are directed to a dual stretch band apparatus including a first band sized to receive a wearer's hand and a second band sized to receive a personal computing device.

Figure 1:
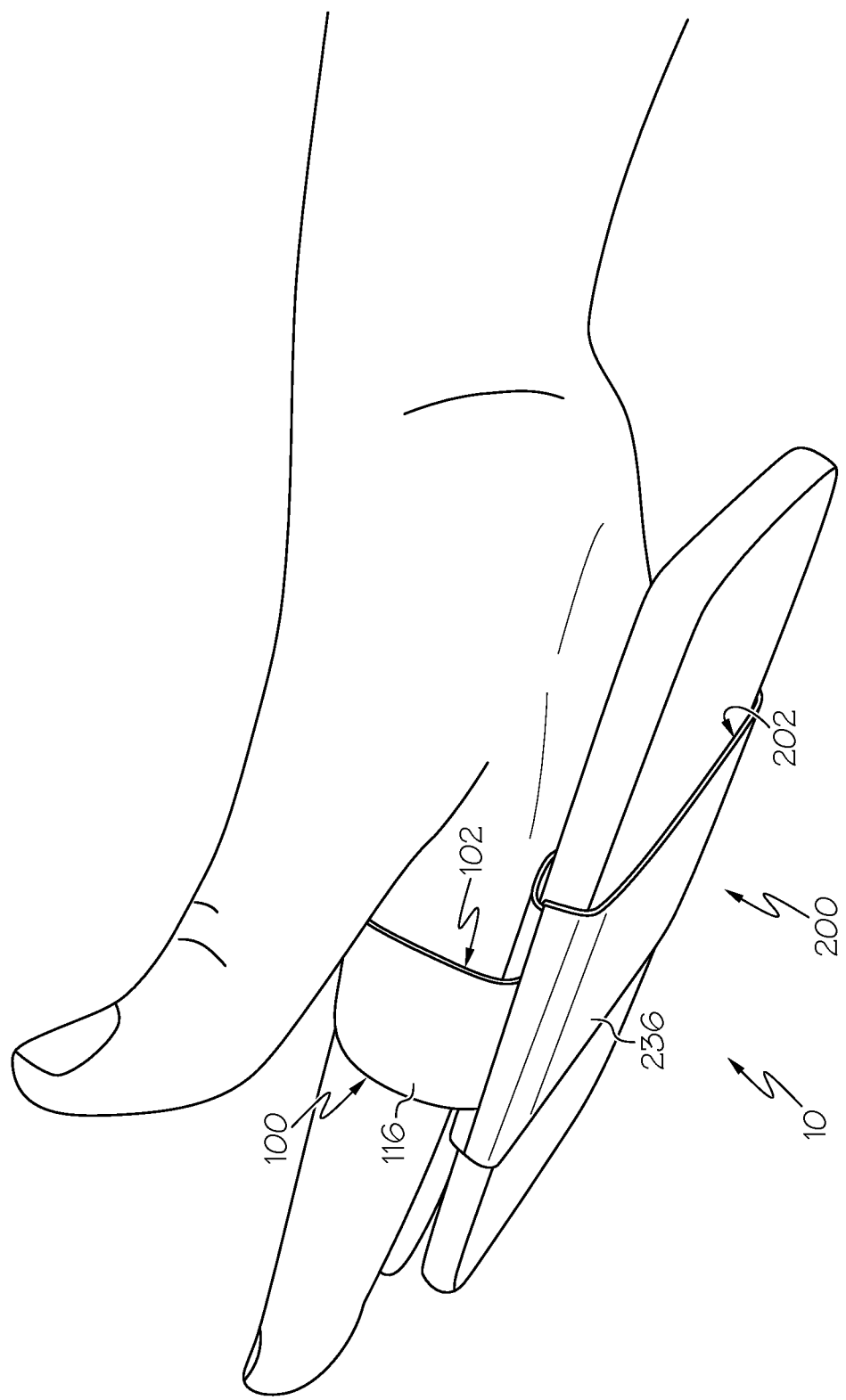
FIG. 1 depicts a perspective view of a dual stretch band apparatus including a first band sized to receive a wearer's hand and a second band sized to receive a personal computing device.

As shown in FIG. 1, a dual stretch band apparatus 10 may include a first band 100 that may comprise an elastic material and be sized such that, when the first band 100 receives the wearer's hand, it stretches to fit the wearer's hand. Thus, friction between a first band inside surface 102 of the first band 100 and the wearer's hand may inhibit the unintentional removal of the first band 100 from the wearer's hand, such as during exercise or other activity, but allow the first band 100 to be selectively removed, such as when the activity is complete.

The dual stretch band apparatus 10 may further comprise a second band 200 that may comprise an elastic material and be sized such that, when the second band 200 receives a personal computing device, it stretches to fit the personal computing device. Thus, friction between a second band inside surface 202 of the second band 200 and the outside surfaces of the personal computing device may inhibit the unintentional removal of the second band 200 from the personal computing device, such as during exercise or other activity, but allow the second band 200 to be selectively removed from the personal computing device, such as when the activity is complete.

Referring to FIGS. 2A-2D and 3, the first band 100 may comprise a single loop of elastic material and may be formed by forming a loop with a first strip 104 of material including a first band first end 106, a first band second end 108, a first band top edge 110, and a first band bottom edge 112. The first strip 104 may be looped by connecting the first band first end 106 to a first dual stretch band seam 12 and the first band second end 108 to a second dual stretch band seam 14 to form the first band inside surface 102 and a first band outside surface 116.

Figure 2A:
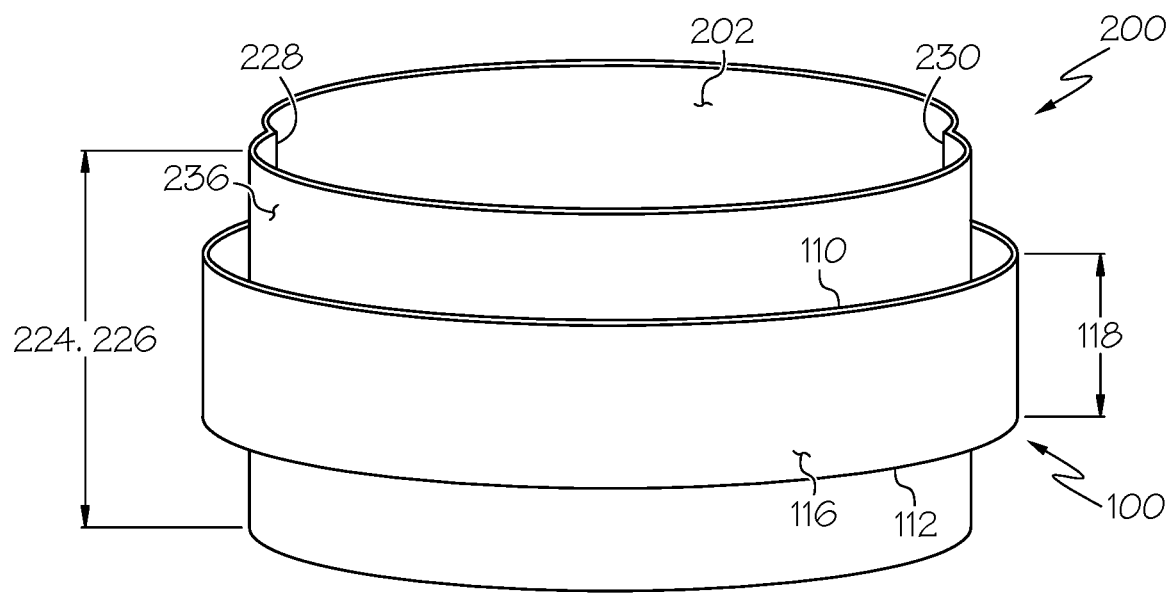
FIG. 2A depicts a schematic front view of the dual stretch band apparatus of FIG. 1, according to one or more embodiments shown and described herein.
Figure 2B:
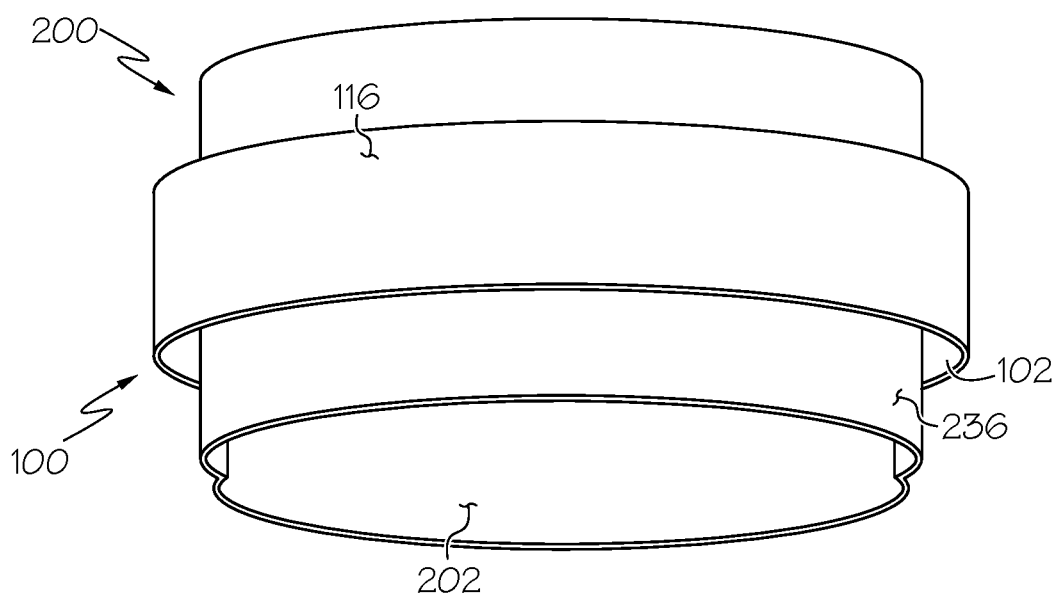
FIG. 2B depicts a second schematic view of the dual stretch band apparatus of FIG. 1, according to one or more embodiments shown and described herein.
Figure 2C:
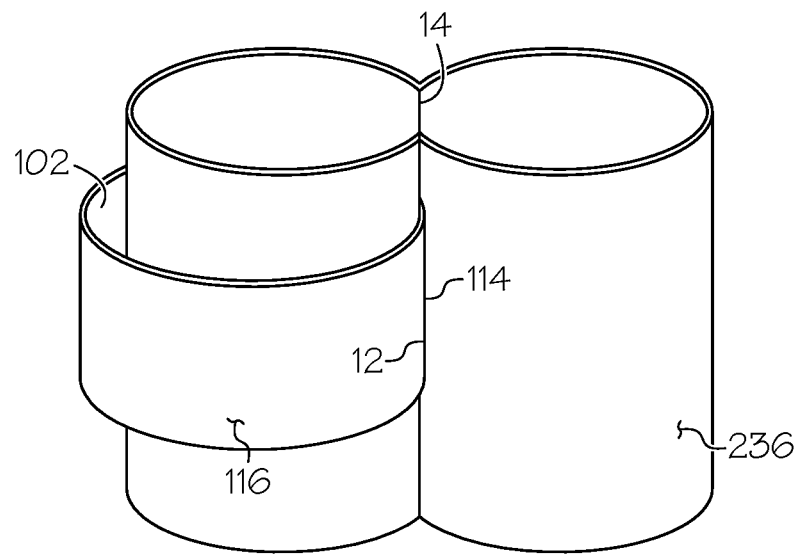
FIG. 2C depicts a schematic side view of the dual stretch band apparatus of FIG. 1, according to one or more embodiments shown and described herein.
Figure 2D:
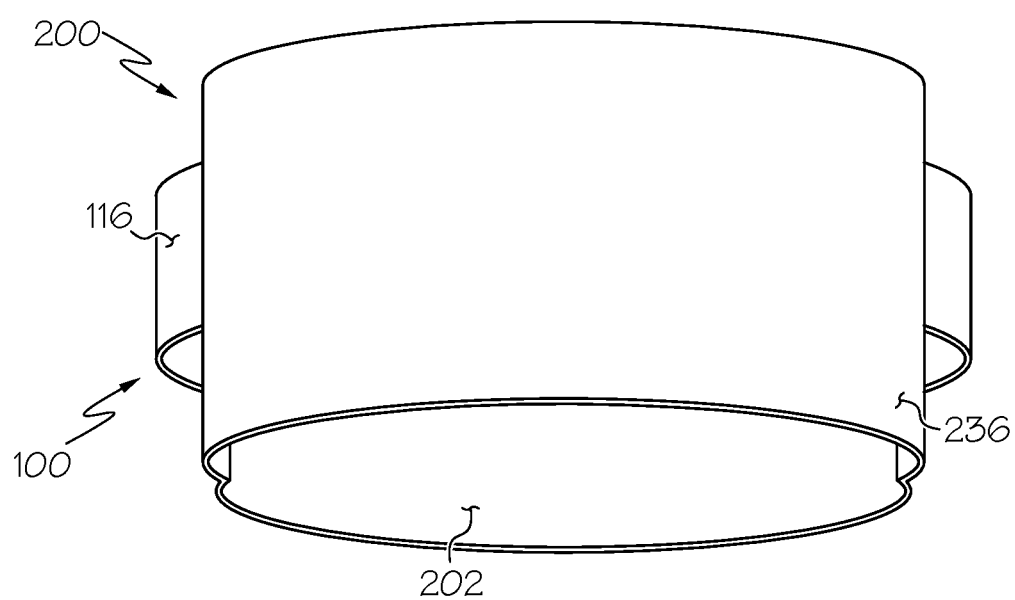
FIG. 2D depicts a schematic view of the back of the dual stretch band apparatus of FIG. 1, according to one or more embodiments shown and described herein.
Figure 3:
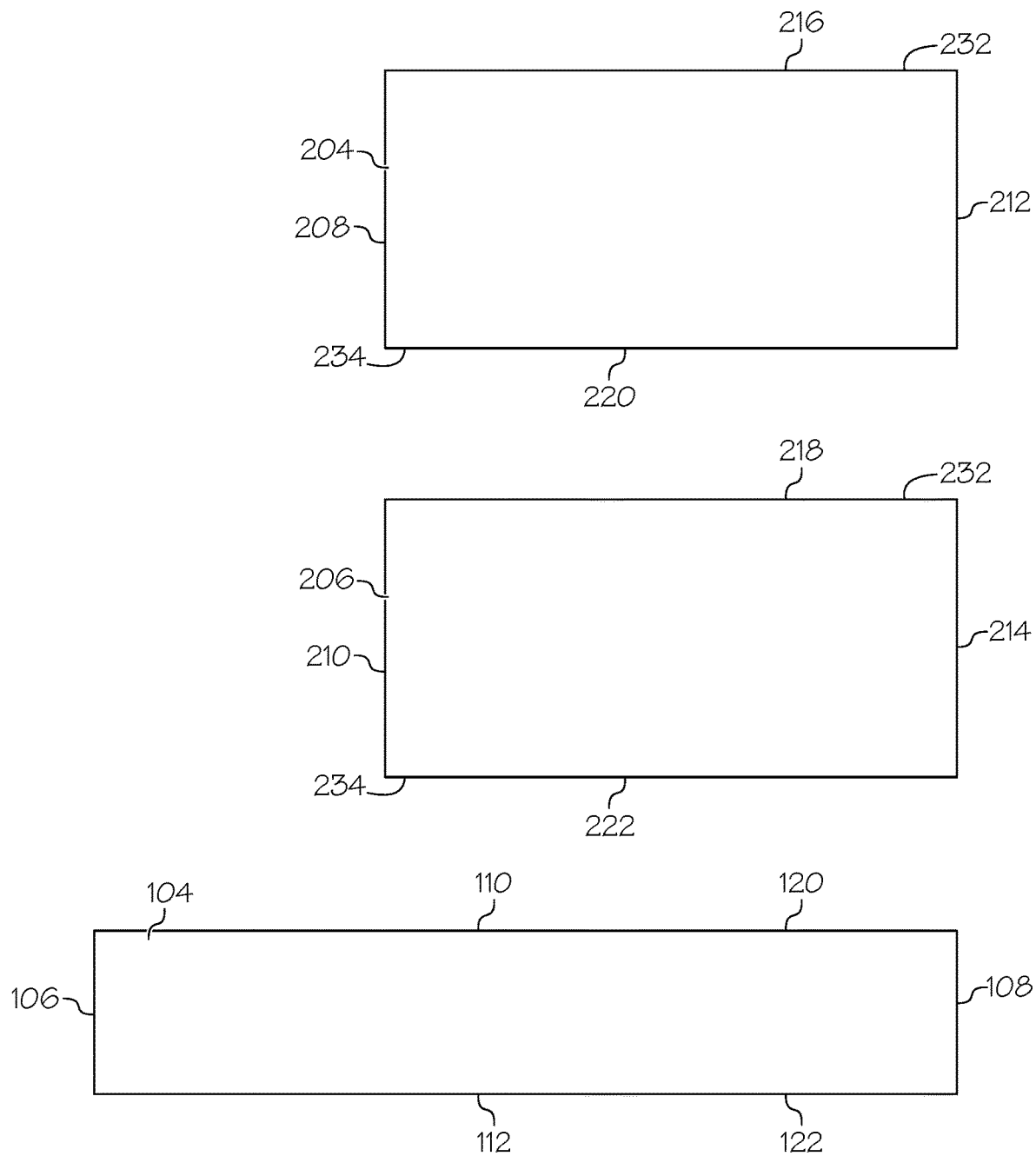
FIG. 3 depicts a photographic view of various components of the dual stretch band apparatus of FIG. 1 before assembly, according to one or more embodiments shown and described herein.

The first band 100 may have a first band width dimension 118 between the first band top edge 110 and the first band bottom edge 112 as shown in FIG. 2A. In some embodiments, the first band width dimension 118 is 1 inch but embodiments are not so limited. In some embodiments, the first band width dimension 118 may be between 0.5 and 1.5 inches. In some embodiments, the first band width dimension 118 is between 0.2 and 1.8 inches.

The first band seam 114 may a connection between one or more of the first band first end 104 and the first band second end 106 with the second band 200. In some embodiments, the first band seam 114 may include a connection between opposite ends of the first strip 104, such as, for example, a sewn connection or it may be formed by some other means, such as, without limitation, by one or more sections of hook and loop fasteners, by button, by zipper, etc. The first band top edge 110 and the first band bottom edge 112 may include a first band top seam 120 and a first band bottom seam 122 to prevent fraying of the material at the first band top edge 110 and the first band bottom edge 112.

The second band 200 may comprise a single loop of elastic material and may be formed by creating a loop using two similarly sized strips of elastic material. The second band 200 may be made from a second band first strip 204 and second band second strip 206 each having a first end 208, 210, a second end 212, 214, a top edge 216, 218, and a bottom edge 220, 222. In some embodiments, the second band 200 may be formed of a plastic material. One or more of the second band first strip 204 and the second band second strip 206 may be a transparent plastic that is compatible with a touchscreen. That is the transparent plastic material is capable of transmitting the touch of a user's finger or hand to a screen of the personal computing device or vice versa such that the touch registers with the screen of the personal computing device. For example, the transparent plastic may be capable of transmitting electric signals to or from a capacitive touchscreen. Accordingly, the personal computing device can register the touch of a user even if the second band 200 surrounds the screen of the personal computing device. In some embodiments, the transparent plastic may be stretchable or have an elastic property.

The second band first strip 204 and the second band second strip 206 may each comprise a second band width dimension 224, 226 between their respective top edges 216, 218 and bottom edges 220, 222 as shown in FIG. 2A. In some embodiments, the second band 200 is 2 inches wide but embodiments are not so limited. In some embodiments, the second band 200 is between 1 and 3 inches. In some embodiments, the second band 200 is between 0.5 and 3.5 inches.

The second band first strip 204 and the second band second strip 206 may be joined at corresponding first ends 208, 210 and second ends 212, 214 at two second band seams 228, 230. The second band seams 228, 230 may each be one continuous connection between opposite edges 216, 218, 220, 222 of the second band first and second strips 204, 206, such as, for example, a sewn connection or the second band seams 228, 230 may be a detachable seam formed by some other means, such as, without limitation, by one or more sections of hook and loop fasteners, by button, by zipper, etc. Each of the second band top edges 216, 218 and the second band bottom edges 220, 222 may include a second band top seam 232 and a second band bottom seam 234 to prevent fraying of material. Once the second band first strip 204 and the second band second strip 206 are joined at opposing ends they form the second band 200 having the second band inside surface 202 and a second band outside surface 236.

In an alternative embodiment, the first band first end 106 and the first band second end 108 may be not be coupled to one another, but instead directly to the second band outside surface 236. The first band first end 106 and the first band second end 108 may be coupled to the second band outside surface 236 at the second band seams 228, 230.

As shown in FIG. 1, the first band 100 may fit over the back of a wearer's hand. In some embodiments, the first band 100 may fit between the major knuckles and the wrist of the wearer, wrapping around the back and the palm of the wearer's hand at the base of the little finger and the purlicue between the thumb and the forefinger. In some embodiments, the first band 100 may be wide enough that, when looped over the hand, the first band 100 covers the wearer's major knuckles.

In some embodiments the second band 200 may be formed by placing the second band first strip 204 adjacent to the second band second strip 206 and coupling the strips along corresponding ends. More specifically, the first ends 208, 210 of the second band first strip 204 and the second band second strip 206 may be sewn together and then the second ends 212, 214 of the second band first strip 204 and the second band second strip 206 may be sewn together. During the sewing, the portions of what will eventually become the second band 200 may be inside out. Once the sewing is complete and the second band 200 is a complete loop, the second band 200 may be flipped right-side out such that the second band outside surface 236 is externally facing.

In one method of forming the dual stretch band apparatus 10, the first band first end 106 is placed between the first ends 208, 210 of the second band first and second strips 204, 206 and the three ends are sewn together to form a first dual stretch band seam 12. The first band second end 108 is then placed between the second ends 212, 214 of the second band first strip 204 and the second band second strip 206. The three ends are sewn together to form a second dual stretch band seam 14. The dual stretch band apparatus 10 is then turned inside out such that the first band outside surface 116 and the second band outside surface 236 are facing outward.

In some embodiments, the first band inside surface 102 includes a sticky or tacky material or raised bumps or other friction enhancing structures for increasing the friction between the first band inside surface 102 and a wearer's hand. In some embodiments, portions or a portion of the second band inside surface 202 include a sticky or tacky material or raised bumps or other friction enhancing structures for increasing the friction between the second band inside surface 202 and the wearer's personal computing device.

In some embodiments, the first band 100 and/or the second band 200 includes one or more slots specifically sized for holding cards, such as, without limitation, credit cards, id cards, phone cards, etc. In some embodiments, the first band 100 and/or the second band 200 includes one or more slots specifically sized for holding a key, such as, for example, a house key or a car key or a key fob. In some embodiments, the first band 100 and/or second band 200 includes one or more slots for holding a hand warmer. In some embodiments, the dual stretch band apparatus 10 may include a third loop for holding a water bottle. In some embodiments, the first and/or second loop may include a lanyard that attaches the personal computing device to the dual stretch band apparatus 10 to prevent the personal computing device from falling if the user removes it from the second band 200 during an activity. While the first band 100 is illustrated as sized to receive a wearers hand, the first band 100 may be sized to be received around other areas of a user's body, such as legs, arms, etc.

In some embodiments, the first band 100 is sized to fit within a corresponding channel of a hand glove (not shown). For example, a wearer may strap the first band 100 within a channel on the back of a glove to add extra protection against the first band 100 from being removed from the hand.

It should now be understood that a dual stretch band apparatus may include a first band made from a single strip of elastic material and a second band made from one or more pieces of material that are sewn together at their corresponding ends. In operation, the first band may stretch to fit over the hand of a user and the second band may stretch to fit around a personal computing device. The dual band apparatus may thus maintain the smart device in contact with the user's hand without the need for user input.

What is claimed is:

1. A dual band apparatus comprising:
   a first band comprising a first band first end and a first band second end;
   a second band comprising a first strip of elastic material and a second strip of elastic material, the first strip having a first strip end and a second strip end, and the second strip having a first strip end and a second strip end; and
   a connection between the first band and the second band, wherein
   the first band first end is sandwiched between both first strip ends of the first and second strips forming a first band seam and the first band second end is sandwiched between both second strip ends of the first and second strips forming a second band seam, the first band is sized such that, when the first band receives a hand of a wearer, the first band stretches to fit around the hand of the wearer, and
   the second band is sized such that, when the second band receives a personal computing device, the second band stretches around the personal computing device to hold the computing device against the hand of the wearer.

2. The dual band apparatus of claim 1, wherein the first band seam and the second band seam extend inwardly toward one another.

3. The dual band apparatus of claim 2, wherein the first and second band seams are detachable seams that are selectively attachable and detachable and are formed by one or more sections of one or more of a hook and loop fastener, buttons, and a zipper.

4. The dual band apparatus of claim 2, wherein at least one of the two strips comprises a transparent plastic.

5. The dual band apparatus of claim 4, wherein the transparent plastic is compatible with a capacitive touch-screen.

6. The dual band apparatus of claim 5, wherein the first band is sized to wrap around the back of the hand of the wearer such that the first band is looped over a purlicue of the wearer.

7. The dual band apparatus of claim 1, wherein the second band is between 1 and 3 inches in width.

8. The dual band apparatus of claim 1, wherein the first band comprises a first band top edge and a first band bottom edge and the first band top edge and the first band bottom edge include a first band top seam and a first band bottom seam, respectively.

9. The dual band apparatus of claim 1, wherein the first band and the second band are sewn together to create the first band seam and the second band seam.

10. The dual band apparatus of claim 1, wherein the first band seam and the second band seam are fixed, non-detachable seams.

11. A dual band apparatus for holding a personal computing device against a body of a wearer, the dual band apparatus comprising:
    a first band;
    a second band comprising a first strip and a second strip; and
    a connection between the first band and the second band, wherein
    a first band first end of the first band is sandwiched between a first strip end of the first strip and a first strip end of the second strip and the first band first end and the first strip ends of the first and second strips are sewn to create a first band seam,
    a first band second end of the first band is sandwiched between a second strip end of the first strip and a second strip end of the second strip and the first band second end and the second strip ends of the first and second strips are sewn to create a second band seam, and
    the first and second bands define a first loop sized to receive a hand of the wearer and a second loop sized to receive a personal computing device, the first band seam and the second band seam extending toward one another within the second loop.

12. The dual band apparatus of claim 11, wherein the second band is between 1 and 3 inches in width.

13. The dual band apparatus of claim 11, wherein the first band comprises a first band top edge and a first band bottom edge and the first band top edge and the first band bottom edge include a first band top seam and a first band bottom seam, respectively.

14. The dual band apparatus of claim 11, wherein the second band comprises a transparent plastic.

15. The dual band apparatus of claim 14, wherein the transparent plastic is compatible with a capacitive touch-screen.

16. A method of forming a dual band apparatus for supporting a personal computing device in a hand of a wearer, comprising:
    placing a first band first end of a first band between a first strip end of a first strip and a first strip end of a second strip and connecting the first band first end and the first strip ends of the first and second strips creating a first band seam;
    placing a first band second end of the first band between a second strip end of the first strip and a second strip end of the second strip and connecting the first band second end and the second strip ends of the first and second strips creating a second band seam and a second band; and
    turning the first band and second band inside out such that the first band seam and the second band seam extend toward each other, wherein
    the first band stretches to fit around the hand of the wearer; and
    the second band stretches around the personal computing device to hold the personal computing device against the hand of the wearer.

17. The method of claim 16, wherein at least one of the first and second band seams comprise a detachable connection.

18. The method of claim 16, wherein the second band comprises a transparent material that is compatible with a touchscreen of the personal computing device.

* * * * *